Oct. 17, 1939.  D. BAIRD  2,176,239
PRODUCTION AND RECOVERY OF LIME
Filed April 23, 1938
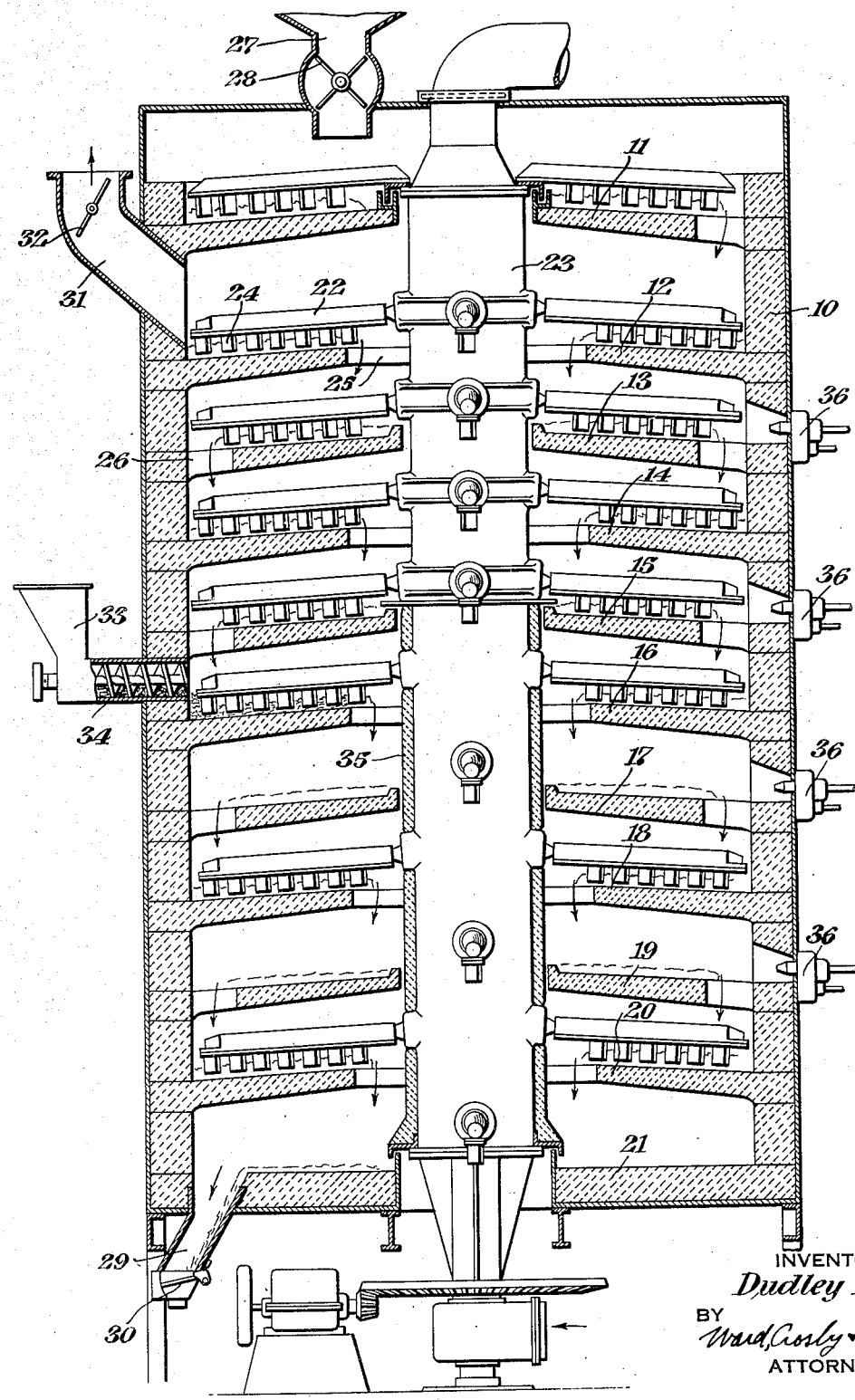
INVENTOR
*Dudley Baird*
BY
*Ward, Crosly & Neal*
ATTORNEYS Patented Oct. 17, 1939

2,176,239

UNITED STATES PATENT OFFICE 2,176,239

PRODUCTION AND RECOVERY OF LIME

Dudley Baird, Berkeley, Calif., assignor to Nichols Engineering & Research Corporation, New York, N. Y., a corporation of Delaware Application April 23, 1938, Serial No. 203,954
In Canada May 7, 1937

1 Claim. (Cl. 23—186)

This invention relates to the manufacture of lime and more particularly to a process for producing lime from material comprising calcium carbonate sludges resulting from the "soda process" for paper pulp manufacture. Also according to this invention, the use of such sludges may be advantageously supplemented by the use of calcium carbonate in the form of so-called "lime spalls".

In the so-called soda process for the manufacture of paper pulp, wood chips are digested with caustic soda (NaOH) with the result that this caustic soda is transformed into sodium carbonate ($Na_2CO_3$), which is removed from the wood pulp by washing. The liquor containing the sodium carbonate is usually thickened by evaporation and then burned, for example in a rotary furnace, to a black ash comprising impure (approximately 80%) sodium carbonate. This impure sodium carbonate is leached and the solution contains a sufficiently pure sodium carbonate for reuse in providing a source of supply of the caustic soda. That is, quick lime (CaO) may be added to the sodium carbonate solution to form caustic soda and calcium carbonate. Calcium carbonate is thus produced as a precipitate and the caustic soda may be filtered from this precipitate and be used again for the digestion of the wood pulp.

Now, in order to reduce the great expense of constantly supplying fresh quantities of lime for the above explained purpose, it is important to recover as much lime as possible from this calcium carbonate sludge, and such recovered lime should be as free as possible of inert material or impurities so that it may be efficiently used in the process of reproduction of caustic soda from sodium carbonate, as above explained.

It has been the practice to heat this calcium carbonate sludge in a rotary kiln at a temperature sufficient to drive off carbon dioxide, leaving a product having a variable percentage of lime. The use of a rotary kiln for this purpose, however, involves a number of troublesome disadvantages, among which the following may be mentioned. When the calcium carbonate sludge is partially dehydrated, its very plastic nature causes large lumps or masses of the material to roll up and accumulate in the rotary kiln, thus precluding the possibility of uniform calcining. As a result, the content of quick lime in the product leaving the rotary kiln, is limited to in the neighborhood of 85%. Thus some 15% or more of fresh lime must be added each time the material is recycled in the process. In view of the large quantity of lime necessary, the expense of this added lime is quite serious.

Furthermore, in order to obtain even the percentage of lime recovery above indicated from the rotary kiln, it is necessary to heat at least a portion of the kiln to temperatures in the neighborhood of 1300–1500° C. This in turn involves considerable fuel expense and the high temperatures necessitate frequent relining of the kiln. Furthermore, with these high temperatures acting on the accumulated lumps of plastic sludge, considerable portions of the exterior of the lumps will become fused and thereafter be inert, while interior portions of the masses will remain inert in the form of calcium carbonate and certain impurities may not be burned out.

With the present invention the difficulties above explained are substantially completely overcome. At the same time a process is provided with which such fresh quantities of lime as may be needed to compensate for the gradual loss of lime in the pulp manufacturing process, may be derived from a source of supply of calcium carbonate comprising lime spalls. The lime spalls useful for this purpose may for example comprise chips of limestone of a size in the neighborhood of one inch or smaller, or a size too small to ordinarily be used in the usual vertical lime calcining kilns.

Various further and more specific objects, features and advantages will clearly appear from the detailed description given below taken in connection with the accompanying drawing forming a part of this specification and illustrating by way of example one form of apparatus which may be used in carrying out the invention. The invention consists in such novel features, processes and process steps as are herein disclosed by way of example.

In the drawing the single figure comprises a vertical cross-sectional view of a furnace adapted for carrying out the processes of the invention.

According to the present invention the calcium carbonate sludge, after being separated from the caustic soda, is preferably washed and filtered to form a filter cake containing in the neighborhood of 40–50% moisture. This filter cake is then passed successively through a plurality of superposed heated zones wherein the material is temporarily retained as an extended layer in each of the zones while at the same time it is periodically agitated and gradually advanced through each zone and from zone to zone. In the first zone or zones, the plastic material is uniformly dried while being agitated in such manner as to substantially avoid the accumulation of lumps. Then as the material is leaving the drying zones, it comprises a finely divided and uniformly dried calcium carbonate. In the subsequent zones, this finely divided product may be uniformly calcined while it is being periodically agitated and advanced in the presence of a countercurrent stream of hot evolved gases which preferably slowly pass over the calcining zones in succession and then over the drying zones in succession.

The above described drying and calcining operations may preferably be carried out in a multiple superimposed hearth furnace. As here shown, the furnace may comprise a cylindrical wall 10 within which a plurality of superposed circular hearths at as 11—20 are contained and supported. The upper hearths, for example Nos. 11–15, inclusive, may serve to provide a series of desired drying zones and the lower hearths, for example Nos. 16–20, and the bottom of the furnace 21, may serve to provide calcining zones. Each of the hearths may be accompanied by a plurality of rabble arms as at 22, these rabble arms being carried by a central rotatable shaft as at 23. As shown, each of the rabble arms may be equipped with a series of rabble teeth as at 24 serving to periodically agitate and gradually advance the material over each hearth and from hearth to hearth. As shown, the rabble teeth at alternate hearths respectively may be mounted in different angular positions, whereby the material is advanced inwardly and outwardly respectively of alternate hearths. At hearths on which the material is advanced inwardly, it is allowed to fall to the succeeding hearth as through a central drop hole such as at 25. On alternate hearths where the material is advanced outwardly, it is allowed to fall through drop holes as at 26 at the hearth periphery, to the hearth below. The central shaft and rabble arm structure may be provided with internal conduits for cooling fluid arranged for example as disclosed in the United States patent to Herreshoff No. 976,175, granted November 22, 1910. The sludge material may be introduced to the top of the furnace as through a hopper 27 provided with a suitable feeding device as at 28. The calcines may be discharged from the bottom of the furnace as through an outlet 29 provided with suitable closure means as at 30 of any desired well-known type for preventing entrance of air at this point. The evolved gases may be discharged from the upper part of the furnace, for example, through an outlet conduit 31 provided with a suitable damper as at 32. The gases evolved during the calcining operation within the lower part of the furnace may travel upwardly through the drop holes of the various hearths and over the material being calcined, and then over the material being dried, whereby considerable heat may be transferred from the calcining zones to accomplish the drying in the drying zones.

When it is desired to provide more lime than may be recovered from the sludge, this may be accomplished by introducing lime spalls into the furnace for example through a hopper as at 33, connected to the furnace as by a suitable screw feed conveyor as at 34, opening into one of the zones preferably intermediate between the top and bottom of the furnace. The quantity of such lime spalls introduced may be either regulated manually or by regulation of the speed of the conveyor 34, so that sufficient calcium carbonate from this source will be introduced to make up the desired quantity of lime. And furthermore by thus regulating the quantity of lime spalls, one may also regulate the temperatures occuring within the calcining zones of the furnace. That is, when such temperatures tend to become excessive, the quantity of lime spalls may be increased, or in case, such as when initially starting the process, the temperatures are too low within the calcining zones, the quantity of lime spalls introduced may be diminished, or the introduction of lime spalls may be omitted until satisfactory calcining temperatures for the sludge have been established.

It is particularly advantageous for several reasons, to introduce the lime spalls at a point where the calcium carbonate sludge has become dried and finely divided and prior to any substantial calcination of the dried sludge. Such procedure has been found to avoid any tendency for lime spalls in conjunction with the masses of sludge to roll up into cakes or balls which would not be uniformly treated. Yet the lime spalls are admitted at a point permitting them to become promptly heated and thoroughly calcined, for forming a high percentage of lime therefrom. Also the introduction of the lime spalls at such point offers a convenient means as above explained for regulating the temperature in the calcining zones. However, if desired it may be found feasible in some cases to introduce the lime spalls at a higher point in the furnace.

The use of this general type of furnace for the purpose has proven highly satisfactory in that it insures comparatively long and uniform exposure of all particles of the material to the heat with the assurance of uniform drying without lumping and subsequent uniform calcining with complete decarbonization. It has been found that with this type of furnace the maximum calcining temperature may be kept within limits in the neighborhood of 950–1070° C. These temperatures are sufficiently low to avoid a fusing effect on the product and result in a considerable saving of fuel. These lower temperatures also eliminate any danger of destruction or deterioration of any parts of the furnace from overheating. And what is perhaps most important, in most cases the product will contain in the neighborhood of 95–98% lime. Even in the absence of ideal conditions, a proportion of lime in excess of 90% may be readily secured with the process. Thus, when the process is properly carried out, from 60–90% of the paper mill's lime expense may be eliminated, with the elimination also of the expense of handling and disposing of a corresponding amount of inert material. Also the above described process of caustic soda recovery may be more efficiently carried out since the system is not loaded with any appreciable quantity of inert material. The calcined lime product is of such form that it may be used directly to treat the sodium carbonate solution, as above explained. The present process further eliminates much of the expense for fuel, power and attendance as compared with the prior rotary kiln practice.

Since the calcium carbonate sludge as it leaves the filter is a difficult material to rabble because of its plasticity when partially dehydrated, it is preferable to provide the multiple hearth furnace with four rabble arms for example, at the drying hearths, whereas two rabble arms may be sufficient at each of the calcining hearths. The rabble teeth at the drying hearths may preferably have a relatively small angle of entrance to the material. The more frequent rabbling at these hearths will still insure proper advance of the material despite such position of the rabble teeth. The central shaft supporting the rabble arms if desired may be covered with refractory material as at 35 in the higher temperature regions of the furnace. Oil or gas burners as at 36 may be provided within the furnace and supplied, if desired, with preheated air derived from the cooling conduits of the rabbling structure in a manner well known in the use of furnaces of this type in the metallurgical arts.

The use of lime spalls to make up the necessary quantity of lime lost in the pulp manufacturing process not only provides an inexpensive source of calcium carbonate in a form heretofore considered to be a waste material, but the use of lime spalls for this purpose is especially convenient at paper mills, since this material can be readily transported and stored without deterioration, so that handling the same is a much less serious matter than would be the handling of burnt lime which, according to the prior practice, it has been customary to purchase to make up the losses.

While the invention has been described in detail with respect to preferred forms thereof, it is not intended to limit the invention to all such details and forms, since various changes and modifications may be made and the invention embodied in different forms without departing from its essential aspects. Hence it is desired to cover all modifications and embodiments coming within the scope of the appended claim.

What is claimed as new and desired to be secured by Letters Patent is:

A process of producing lime which comprises, taking calcium carbonate sludge resulting from the "soda process" of paper pulp manufacture, reducing the water content thereof sufficiently to form a plastic cake-like substance, then passing said substance successively over a plurality of enclosed superposed heated hearths, temporarily retaining said substance as an extended layer on each of said hearths while periodically rabbling and thereby gradually advancing it over each hearth and from hearth to hearth, in the presence of streams of hot gases and air, whereby the calcium carbonate is dried at the first hearth or hearths and becomes finely divided, and introducing quantities of lime spalls on to a hearth where said calcium carbonate is relatively hot and dry, whereby on the subsequent hearth or hearths the dried calcium carbonate and said lime spalls are thoroughly calcined to produce the lime.

DUDLEY BAIRD.